United States Patent
Thaemlitz et al.

(10) Patent No.: US 11,148,977 B2
(45) Date of Patent: Oct. 19, 2021

(54) SOREL CEMENT COMPOSITION AND METHOD TO CURE LOSS OF CIRCULATION

(71) Applicant: Saudi Arabian Oil Company, Dhahran (SA)

(72) Inventors: Carl Thaemlitz, Cypress, TX (US); Ashok Santra, The Woodlands, TX (US)

(73) Assignee: Saudi Arabian Oil Company, Dhahran (SA)

( * ) Notice: Subject to any disclaimer, the term of this patent is extended or adjusted under 35 U.S.C. 154(b) by 107 days.

(21) Appl. No.: 16/593,667

(22) Filed: Oct. 4, 2019

(65) Prior Publication Data

US 2021/0101833 A1 Apr. 8, 2021

(51) Int. Cl.
  *C09K 8/46* (2006.01)
  *C04B 28/32* (2006.01)

(52) U.S. Cl.
  CPC ............... *C04B 28/32* (2013.01); *C09K 8/46* (2013.01)

(58) Field of Classification Search
  CPC ............................ C04B 28/32; E21B 33/13
  See application file for complete search history.

(56) References Cited

U.S. PATENT DOCUMENTS

| | | | |
|---|---|---|---|
| 1,811,799 A * | 6/1931 | Lukens | C04B 28/32 106/685 |
| 5,645,637 A | 7/1997 | Yaniv | |
| 6,664,215 B1 | 12/2003 | Tomlinson | |
| 7,497,258 B2 | 3/2009 | Savery et al. | |
| 7,527,098 B2 | 5/2009 | Santra et al. | |
| 7,637,319 B2 | 12/2009 | Savery et al. | |
| 7,654,326 B1 | 2/2010 | Santra et al. | |
| 7,833,344 B2 | 11/2010 | Santra et al. | |
| 7,893,011 B2 | 2/2011 | Lewis et al. | |
| 8,418,763 B1 | 4/2013 | Deen et al. | |
| 9,023,150 B2 | 5/2015 | Brenneis et al. | |
| 9,617,460 B2 | 4/2017 | Reddy | |
| 9,708,869 B2 | 7/2017 | Sarmah et al. | |
| 10,150,905 B1 | 12/2018 | Reddy | |
| 2010/0006288 A1 | 1/2010 | Santra et al. | |
| 2015/0033719 A1 | 2/2015 | Lawrence et al. | |

FOREIGN PATENT DOCUMENTS

| WO | WO 2016053319 | 4/2016 |
|---|---|---|
| WO | WO 2019147559 | 8/2019 |

OTHER PUBLICATIONS

PCT International Search Report and Written Opinion in International Appln. No. PCT/US2020/053972, dated Feb. 4, 2021, 14 pages.

* cited by examiner

*Primary Examiner* — Angela M DiTrani Leff
*Assistant Examiner* — Avi T Skaist
(74) *Attorney, Agent, or Firm* — Fish & Richardson P.C.

(57) ABSTRACT

A system and method for applying a cement composition, including storing a slurry, adding magnesium oxide to the slurry to give a magnesium-oxychloride cement slurry, pumping the magnesium-oxychloride cement slurry into a wellbore, and sealing a loss circulation zone in the wellbore.

34 Claims, 6 Drawing Sheets

FIG. 8

SOREL CEMENT COMPOSITION AND METHOD TO CURE LOSS OF CIRCULATION

TECHNICAL FIELD

This disclosure relates to relates to a loss circulation zone in a wellbore.

BACKGROUND

In oil or gas well drilling, loss circulation occurs when drilling fluid (mud) or cement slurry flows into the geological formation instead of flowing up the annulus between the formation and the casing or work string. Loss circulation is the partial or complete loss of drilling fluid or cement slurry to the formation during drilling or cementing operations. Loss circulation can be brought on by natural or induced causes. Natural causes include naturally fractured formations or unconsolidated zones. Induced losses occur when the hydrostatic fluid column pressure exceeds the fracture gradient of the formation and the formation pores break down adequately to receive rather than resist the fluid. For non-cavernous formations, a loss circulation zone may be the result of fractures in the geological formation at the borehole or wellbore. When loss circulation occurs, both drilling fluid and cement slurry can be lost. Circulation losses of fluids during drilling can be responsible for Non-Productive Time (NPT) and cause economic losses due to remedial treatments, additional casings for the wellbore, and lost drilling fluids (including non-aqueous fluids).

In cementing, the cement slurry may be pumped from the surface down the interior of the casing and then upward from the bottom through the annulus between the casing and the formation. When the cement reaches the loss circulation zone, the cement does not adequately continue upward. The loss of cement slurries to such thief zones can cause problems during cementing including resulting in inadequate amounts of cement slurry in the casing annulus between the casing and the geological formation. The inadequate amounts of cement slurry could lead to poor zonal isolation during the productive phase. The productive phase is the production of hydrocarbon from the geological formation through the wellbore to the Earth surface.

SUMMARY

An aspect relates to a method of applying a cement composition, including storing a slurry having water and magnesium chloride. The slurry as stored may also include a retarder, a viscosifier, and an azo compound, or any combinations of these. The method includes adding MgO and a foam stabilizer to the slurry to give a magnesium-oxychloride cement slurry. The method includes pumping the magnesium-oxychloride cement slurry into a wellbore in a geological formation and sealing a loss circulation zone in the wellbore with the magnesium-oxychloride cement slurry.

Another aspect relates to a method of applying a cement composition, including storing a first slurry having water and magnesium chloride. The first slurry may also have a retarder, a viscosifier, and an azo compound, or any combinations of these. The method includes adding MgO and a foam stabilizer to the first slurry to give a second slurry. The second slurry forms a magnesium-oxychloride cement slurry. The method includes pumping the second slurry into a wellbore in a subterranean formation to fill fractures in the subterranean formation with the second slurry to seal a loss circulation zone along the wellbore.

Yet another aspect relates to method of applying a cement composition, including holding a storable slurry in a vessel for at least 24 hours. The storable slurry includes water, magnesium chloride, and an azo compound. The storable slurry in the vessel may also include a retarder or a viscosifier, or both. The method includes mixing MgO and a foam stabilizer with the storable slurry after holding the storable slurry to give a cement slurry. The method includes pumping the cement slurry into a wellbore in a geological formation to fill fractures in the geological formation with the cement slurry to seal a loss circulation zone along the wellbore.

Yet another aspect relates to a system to apply a cement composition at a well site. The system includes a vessel at the well site to store a slurry for at least 24 hours at a temperature less than 140° F. The slurry has a pH of less than 5. The slurry includes water, magnesium chloride, and an azo compound. The storable slurry may also include a retarder or a viscosifier, or both. The vessel is disposed at a well site and is adjacent a wellbore formed in a geological formation. The system includes an addition conduit to add MgO to the slurry to give a magnesium-oxychloride cement slurry. The system includes a pump to provide motive force for conveying the magnesium-oxychloride cement slurry into the wellbore to fractures in the geological formation at a loss circulation zone along a range of depth of the wellbore.

The details of one or more implementations are set forth in the accompanying drawings and the description presently. Other features and advantages will be apparent from the description and drawings, and from the claims.

BRIEF DESCRIPTION OF DRAWINGS

Like reference numbers and designations in the various drawings indicate like elements.

DETAILED DESCRIPTION

Some aspects of the present disclosure are directed to storing a first portion of a cement composition and then mixing a second portion of the cement composition with the first portion at the time of application of the cement composition (as a slurry). The application may be downhole in a wellbore in a geological formation. The techniques may save time as compared to conventional downhole application of a cement slurry. The techniques may make available a cement slurry more readily on-demand for application downhole in a wellbore in a geological formation.

As indicated, a portion of the cement composition may be prepared and stored, such as in a vessel on-site at the wellbore. As timing for need of the cement slurry approaches, the remaining components of the cement composition may be added on-site at the wellbore. The remaining components may be added to the stored portion in the storage vessel, in an on-site mix vessel, or on-the-fly as the stored portion is being pumped into the wellbore.

The cement in the cement composition may be magnesium oxychloride cement, which may be labeled as Sorel cement or magnesia cement. The cement composition may expand as being applied downhole to fill fractures of unknown dimensions in the geological formation. The filling of the fractures with the expandable magnesium-oxychloride cement may be a treatment to cure loss circulation caused by the fractures.

Fractures and other features in a geological formation can cause loss circulation from a wellbore into the geological formation. Other features can include, for example, higher permeability or localized unconsolidated formation. The geological formation can be, for example, carbonate rock or shale rock. Information regarding the fractures causing the loss circulation may not be readily available. The lack of accurate facts about the prevalence, size, and geometries (for example, fracture width) of fractures in a given zone along the wellbore can be problematic. Lack of such information can make difficult the selection of type and amount of plugging materials as the loss circulation material (LCM) for treating the loss circulation. Traditional LCM may not be effective for sealing a loss circulation zone unless applied in an adequate or correlative amount in relation to the extent of the fractures. The extent of the fractures may not be known. Traditional LCM may include, for example, non-reactive particulate (including fiber-based) or settable fluids-type.

The present disclosure is directed to plugging loss of circulation in a wellbore with a magnesium oxychloride cement (Sorel cement) as an LCM. The magnesium oxychloride cement is expandable in volume to seal fractures of unknown dimensions that contribute to the loss circulation. The magnesium oxychloride cement includes a nitrogen-generating agent, such as an azo compound (for example, azodicarbonamide), to expand the magnesium oxychloride cement in application. Nitrogen gas is generated in the magnesium oxychloride cement in-situ while the magnesium oxychloride cement slurry is pumped (flowing within the wellbore) and as applied downhole.

Figure 1:
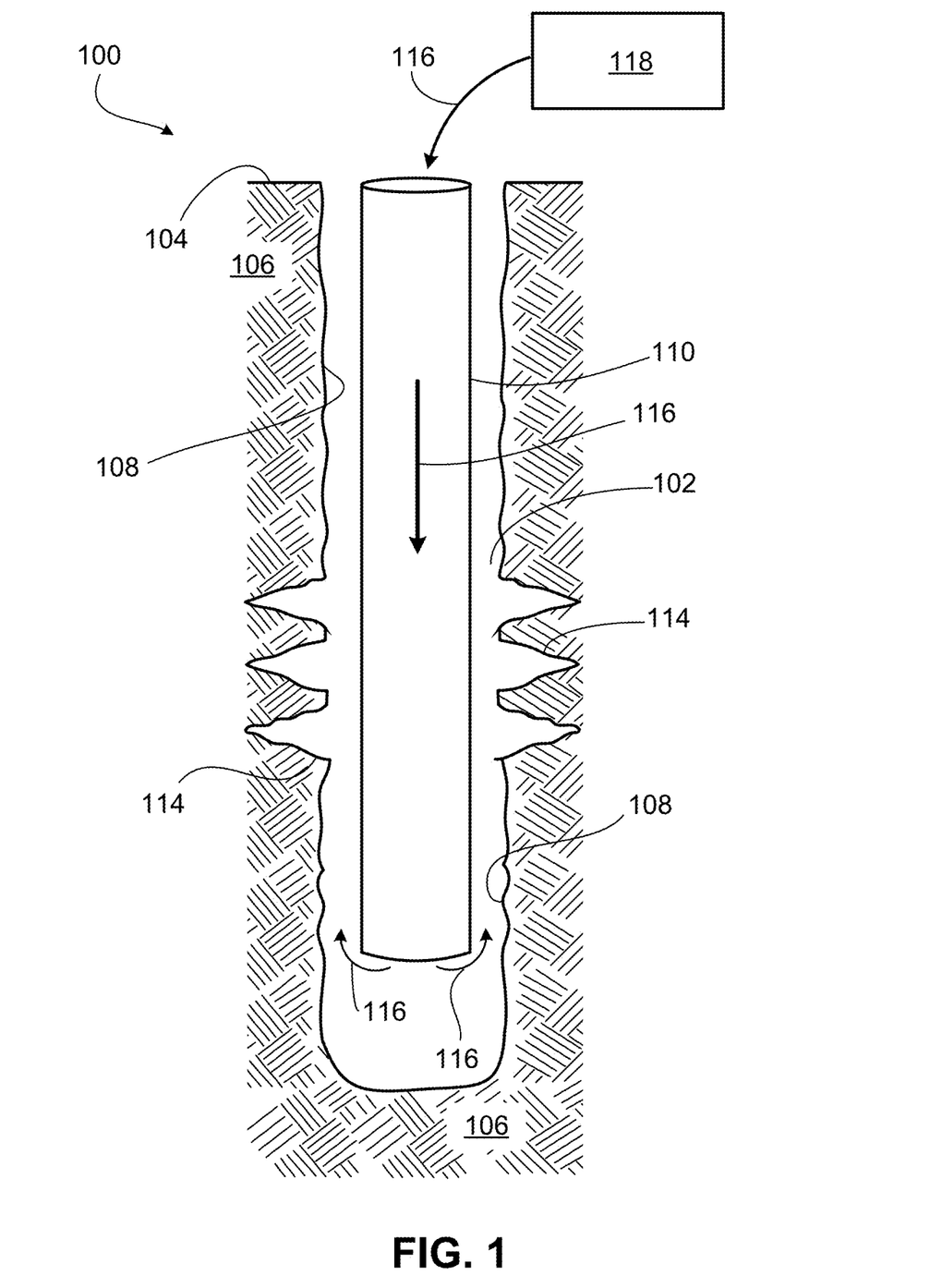
FIG. 1 is a diagram of a well site having a wellbore through the Earth surface into a geological formation in the Earth crust.

FIG. 1 is a well site 100 having a wellbore 102 through the Earth surface 104 into a geological formation 106 in the Earth crust. The geological formation 106 may also be labeled as a subterranean formation or hydrocarbon formation. Hydrocarbon may be produced from the geological formation 106 through the wellbore 102 to the surface 104. The hydrocarbon may be crude oil or natural gas, or both.

To form the wellbore 102, a hole is drilled into the geological formation 106 to generate a drilled formation surface 108 as an interface for the wellbore 102 with the geological formation 106. The formation surface 108 may be characterized as the wellbore wall 102. The wellbore 102 may be openhole or have a cylindrical casing 110 as shown. The wellbore 102 in the depicted implementation of FIG. 1 is a cased wellbore 102.

In the illustrated embodiment, the wellbore 102 has a loss circulation zone 112. Fractures 114 in the geological formation 106 along the wellbore 102 cause the loss circulation. To cure the loss circulation, a magnesium-oxychloride cement slurry 116 is provided by surface equipment 118 into the wellbore 102. Components of the surface equipment 118 may be located adjacent or near (for example, less than 50 meters from) the wellbore 102.

As described in more detail later, the surface equipment 118 may prepare and store an initial portion of the magnesium-oxychloride cement slurry 116. The initial portion may be stored at the well site 100 and available on demand. Then, at the time for application of the cement slurry 116 (as an LCM pill), the surface equipment 118 may add the remaining portion of the magnesium-oxychloride cement slurry 116 to the initial portion to give the magnesium-oxychloride cement slurry 116. The surface equipment 118 may provide the magnesium-oxychloride cement slurry 116 into the casing 110 in the wellbore 102.

The surface equipment 118 may include a centrifugal pump to pump the cement slurry 116 downward through the casing 110. The cement slurry 116 exits the bottom of the casing 110 and flows upward in the annulus between the casing 110 and the formation surface 108 (wellbore 102 wall). The magnesium-oxychloride cement slurry 116 reaches the fractures 114 to seal the fractures 114.

Nitrogen gas is generated in the cement slurry 116 as the slurry 116 flows to the fractures 114 and while residing in the fractures 114. The generated nitrogen gas expands the cement slurry 116 in the fractures 114 such that the cement slurry 116 may fill fractures 114 of unknown dimensions. The cement slurry 116 may set, cure, or harden into cement.

The cement slurry 116 cures and hardens into a magnesium oxychloride cement in the fractures 114 to seal or plug the fractures 114 and thus remedy and stop the loss circulation. The cement slurry 116 sets into hard magnesium oxychloride cement. Setting time can be tuned as desired by adjusting the amount or type of retarder in the cement slurry 116.

The magnesium oxychloride cement as hardened is typically set cement. The set cement may be self-degradable and acid-soluble. Therefore, if and when desired, the set cement may be displaced (for example, via acid treatment) from the annulus between the casing 110 and the formation surface 108. In some implementations, it may be desirable that the cement in the fractures 114 degrade soon after setting of the cement. The plugging of the fractures 114 may be temporary so not to interfere with subsequent wellbore operation. In some embodiments, the cement plug may desirably degrade soon after the LCM operation is completed.

In the present disclosure, a series of settable and acid-soluble type LCM fluids based on magnesium oxychloride cement are provided that can generate nitrogen gas in-situ while being pumping downhole. Therefore, these LCM fluids as magnesium oxychloride cement are expandable. Being expandable, the volume of such settable LCM adapts including under downhole pressure to seal fractures of unknown dimensions. Embodiments may include techniques of applying an expandable, acid soluble, and self-degradable magnesium-oxychloride cement composition to cure loss of circulation.

Magnesium oxychloride may be a term for chemical compounds of magnesium (Mg), chlorine (Cl), oxygen (O), and hydrogen (H) and having general formula $xMgO \cdot yMgC_2 \cdot zH_2O$, for various values of x, y, and z; or equivalently $Mg_{x+y}(OH)_{2x}Cl_{2y}(H_2O)_{z-x}$. Other names for this class are magnesium chloride hydroxide, magnesium hydroxychloride, and basic magnesium chloride. Some of these compounds are components of Sorel cement.

The reaction for magnesium oxychloride cement (MOC) involves mixing magnesium oxide (MgO) (also called magnesia) with magnesium chloride ($MgCl_2$) (or its various hydrates). Water ($H_2O$) is included in the mixture. MgO generally consists of a lattice of $Mg^{2+}$ ions and $O^{2-}$ ions held together by ionic bonding. The type of MgO may be (a)

amorphous, (b) light burnt, (c) hard burnt, or (d) dead burnt. An example generic reaction scheme for magnesium oxychloride cement is: $MgO+MgCl_2+H_2O \rightarrow 3Mg(OH)_2 \cdot MgCl_2 \cdot 8H_2O$ (3-form) and $5Mg(OH)_2 \cdot MgCl_2 \cdot 8H_2O$ (5-form). A retarder that slows the reaction may be added to the mixture. The retarder may be, for example, sodium hexametaphosphate (SHMP) or boric acid. The 3-form (also known as phase 3) and the 5-form (also known as phase 5) may exist and be stable at ambient temperatures or greater. The 3-form and 5-form may initially be gel-like homogenous phases that crystallize as crystalline solids.

To generate nitrogen gas in-situ, an azo compound (for example, azodicarboxamide) as a nitrogen-generating agent is included in the MOC composition. To stabilize the formed nitrogen gas within the cement-slurry fluid as foam, a foam stabilizer (also called foamer or foaming agent) may be included in the MOC composition. The foam stabilizer may be a surfactant, such as a betaine (for example, hydroxysulfobetaine) or a hydroxysultaine (for example, cocoamidopropyl hydroxysultaine). A commercially-available foam stabilizer that contains cocoamidopropyl hydroxysultaine is PETROSTEP™ SB available from Stepan Company having headquarters in Northfield, Ill., USA. The PETROSTEP™ SB foam stabilizer includes cocoamidopropyl hydroxysultaine (43.5 weight percent [wt %]), water (50 wt %), and sodium chloride (6.5 wt %).

The MOC composition may also include a viscosifier to increase viscosity of the MOC slurry. The viscosifier may be, for example, a hydroxyethyl cellulose (HEC), a carboxymethylhydroxyethyl cellulose (CMHEC), or a polysaccharide, or their derivatives. Applicable polysaccharides include xanthan or xanthan gum, diutan gum, and galactomannan polysaccharide (guar gum or guaran).

To save time during deployment, a storable slurry is prepared by mixing water, $MgCl_2$ or $MgCl_2$ hydrate, an azo compound, a retarder, and a viscosifier. Compositions with exemplary weight-percent ranges for the storable slurry include water (35%-80%, 45%-75%, 50%-70%), $MgCl_2$ or $MgCl_2$ hydrate (20%-65%, 25%-55%, 30%-50%), azo compound (0.2%-6%, 0.5%-4%, 0.8%-3.5%), retarder (0.1%-10%, 0.1%-6%, 0.1%-4%), and viscosifier (0.1%-3%, 0.2%-2%, 0.3%-1.5%). In some implementations, the $MgCl_2$ or $MgCl_2$ hydrate is $MgCl_2 \cdot 6H_2O$.

In implementations, while potentially less efficient, at least one of the azo compound, retarder, or viscosifier are not included in the storable slurry but instead added later with the MgO and foam stabilizer. The foam stabilizer is generally not included in the storable slurry but added later with the MgO. Foam stabilizers may be generally higher pH fluids (e.g., greater than pH of 7) and therefore if included with the storable slurry (e.g., in the storage vessel) might undesirably increase the pH of the storable slurry as stored.

In implementations, the azo compound has the formula (I):

(I)

or a salt thereof, where:

$X^1$ and $X^2$ are each independently selected from $C_{1-6}$ alkyl, $C_{2-6}$ alkenyl, $C_{2-6}$ alkynyl, $OR^{a1}$, and $NR^{c1}R^{d1}$; and each $R^{a1}$, $R^{c1}$, and $R^{d1}$ is independently selected from H, $C_{1-6}$ alkyl, $C_{2-6}$ alkenyl, $C_{2-6}$ alkynyl, $C_{3-7}$ cycloalkyl, and $C_{6-10}$ aryl.

As mentioned, the retarder included in the storable slurry slows the subsequent reaction of the MgO with the $MgCl_2$ in the formation of the magnesium oxychloride cement. In some implementations, the amount of retarder included may be tied to the amount of MgO to be added at the time of LCM treatment. For example, the amount of retarder in the storable slurry may be at least 1.5 wt %, at least 2 wt %, or at least 2.5 wt % of the amount of MgO to be added.

The prepared storable slurry may be stored, for instance, in a vessel (for example, vessel 200 in FIGS. 2-4) at a temperature up to 140° F. The pH of the slurry may be less than 5, less than 4, or less than 3.5. In some implementations, the pH of the storable slurry is at least 2.5, at least 3, or at least 3.5. The pH may be in ranges of 3 to 5, 3 to 4, 3.3 to 5, 3.3 to 4.5, or 3.3 to 4.2. The consistency of the storable slurry may such that the storable slurry is pourable from a container. As for stability, the storable slurry may remain generally homogenous with little or no fluid separation during the time period of storage (for example, at least 24 hours). The storage life of the storable slurry may be at least 24 hours at temperatures less than 140° F.

To form the magnesium-oxychloride cement slurry 116, MgO and a foam stabilizer may be added to the storable slurry. The composition of the magnesium-oxychloride cement slurry 116 provided into the wellbore may have the following weight-percent ranges: storable slurry (45%-80%, 50%-80%, 55%-75%, 60%-70%), MgO (15%-50%, 20%-40%, 25%-35%), and foam stabilizer (0.3%-6%, 0.5%-4%, 1%-3%). Thus, the composition of the magnesium-oxychloride cement slurry 116 may have the following components and weight-percent ranges: water (20%-55%, 30%-50%, 35%-45%), $MgCl_2$ or $MgCl_2$ hydrate (10%-40%, 15%-35%, 20%-30%), MgO (15%-50%, 20%-40%, 25%-35%), azo compound (0.1%-4%, 0.3%-2.5%, 0.5%-1.5%), retarder (0.05%-6%, 0.1%-4%, 0.1%-3%), and viscosifier (0.05%-2%, 0.2%-1%, 0.2%-0.8%).

Figure 2:
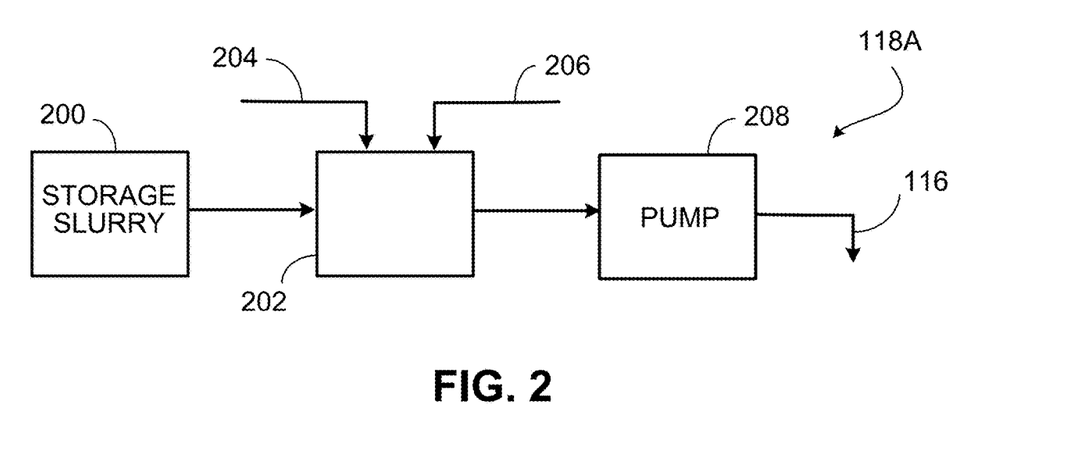
FIGS. 2-4 are block diagrams of respective embodiments of the surface equipment of FIG. 1.

FIG. 2 is surface equipment 118A that is an embodiment of the surface equipment 118 at the well site 100 of FIG. 1. The surface equipment 118A provides the magnesium-oxychloride cement slurry 116 to the wellbore 102 (FIG. 1). The surface equipment 118A includes a storage vessel 200 to store the aforementioned storable slurry. The storable slurry may be a storable mixture of some components of a magnesium-oxychloride cement slurry. The storable slurry may be labeled as an initial portion or first portion of the magnesium-oxychloride cement slurry. The storage vessel 200 may reside on the surface 104 (FIG. 1) at the well site 100. The storage vessel 200 may be skid-mounted or reside on a vehicle at the well site 100. The storage vessel 200 may be near or adjacent the wellbore 102, such as within 50 meters of the wellbore 102.

As discussed, the components of the storable slurry include water, $MgCl_2$ or $MgCl_2$ hydrate, an azo compound, a retarder, and a viscosifier. The present techniques may include preparing the slurry, which can involve combining or mixing the water, the magnesium chloride, the retarder, the viscosifier, and the azo compound. The components may be combined upstream of the vessel 200 and the mixture added to the vessel 200. Alternatively, individual components may be added to the vessel 200 and combined in the vessel 200. Some components may be combined upstream and other individual components combined in the vessel 200. For components combined upstream, the components may be combined in an upstream vessel and the mixture conveyed (for example, via a pump or pressure differential) to the storage vessel 200. The storable slurry (for example, pH less than 5) may be stored in the vessel 200 for greater than 24 hours at a temperature less than 140° F.

The surface equipment 118A includes a mix vessel 202. At the time for application of the magnesium-oxychloride cement slurry 116, the storable slurry is provided from the storage vessel 200 to the mix vessel 202. The motive force for flow of the storable slurry may be by pressure differential between the storage vessel 200 and the mix vessel 202. Alternatively, the motive force for flow of the storable slurry from the storage vessel 200 to the mix vessel 202 may be provided by a centrifugal pump (not shown).

Magnesium oxide 204 and a foam stabilizer 206 are added to the mix vessel 206. While two streams 204 and 206 are depicted, a single stream having both the magnesium oxide 204 and the foam stabilizer 206 may be added to the mix vessel in certain implementations. The magnesium oxide 204 and foam stabilizer 206 may be labeled as the remaining portion or second portion of the magnesium-oxychloride cement slurry 116.

The magnesium oxide 204 and the foam stabilizer 206 are combined with the storable slurry in the mix vessel 202 provided from the vessel 200. The combining of the magnesium oxide 204 and the foam stabilizer 206 with the storable slurry may be a batch operation. In some implementations, the mix vessel 202 may have mechanical agitator to promote mixing of the magnesium oxide 204 and the foam stabilizer 206 with the storable slurry. The mechanical agitator may be, for example, a propeller, blade turbine, or ribbon blender. Agitation or mixing may instead be provided by the introduction of a fluid to the mix vessel 202 at a velocity to promote mixing. Alternatively, mixing can be advanced with a recirculation line (not shown). For instance, a conduit may be routed (branch) from the discharge conduit at the discharge of the pump 208 back to the mix vessel 202. Thus, in those implementations, the contents (for example, the magnesium-oxychloride cement slurry) of the mix vessel 202 may be recirculated for mixing prior to delivery of the magnesium-oxychloride cement slurry into the wellbore 102.

In the illustrated embodiment, the magnesium-oxychloride cement slurry 116 is pumped via the pump 208 (for example, a centrifugal pump) into the wellbore 102. The pump may be coupled to the second vessel to receive the magnesium-oxychloride cement slurry from the second vessel and pump the magnesium-oxychloride cement slurry into the wellbore. A conduit (for example, pipe or piping) on the discharge of the pump 208 may route the cement slurry 116 from the pump 208 to the wellbore 102. In implementations, the pump 208 and the discharge conduit may introduce the cement slurry 116 into a casing 110 in the wellbore 102. As discussed, the magnesium-oxychloride cement slurry 116 may be utilized as an LCM pill to treat a loss circulation zone.

The storage vessel 200 and the mix vessel 202 may each be configured to hold a slurry having a pH less than 5, less than 4, or less than 3.5. For instance, the storage vessel 200 and the mix vessel 202 may each be constructed of or lined with a material stable when exposed to an acidic slurry. The material may be, for example, plastic, rubber, glass, ceramic, high density polyethylene (HDPE), cross-linked polyethylene (XLPE), fiber-reinforced polymer (FRP), nickel, and nickel alloys. In some implementations, the vessels 200 or 202 may be carbon steel with the internal volume lined, for example, with rubber or glass.

Figure 3:
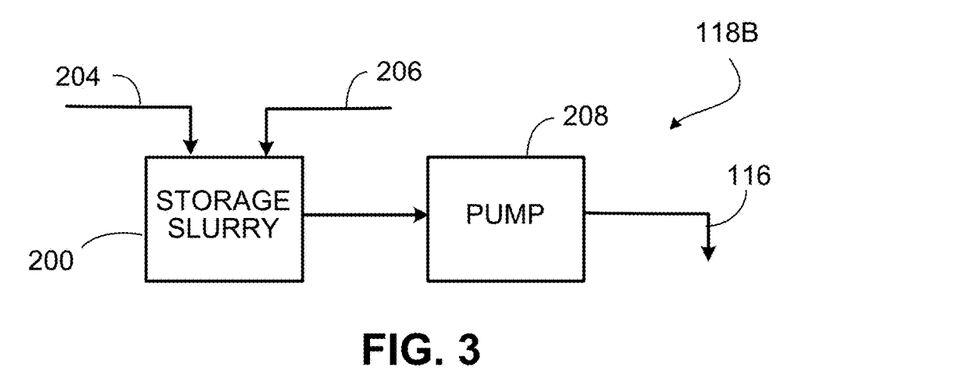

FIG. 3 is surface equipment 118B that is an embodiment of the surface equipment 118 at the well site 100 of FIG. 1. The surface equipment 118B provides the magnesium-oxychloride cement slurry 116 to the wellbore 102 (FIG. 1). The surface equipment 118A includes a storage vessel 200 to store the aforementioned storable slurry. As discussed, the storable slurry may be a storable mixture of some components of a magnesium-oxychloride cement slurry. As described with respect to FIG. 2, the storage vessel 200 may reside near or adjacent the wellbore 102 on the surface 104 (FIG. 1), on a skid, or on a vehicle. The storage vessel 200 may be within 50 meters of the wellbore. The components of the storable slurry may be combined before addition to the vessel 200 or combined in the vessel 200. As indicated, the storable slurry may be stored in the storage vessel 200 for at least one day, at least two days, at least 3 days, or at least a week.

In this embodiment, the surface equipment 118B does not include a separate mix vessel. Instead the storage vessel 200 is also utilized as a mix vessel. At the time for application of the magnesium-oxychloride cement slurry 116, magnesium oxide 204 and a foam stabilizer 206 are added to the storage vessel 200. While two streams 204 and 206 are depicted, a single stream having both the magnesium oxide 204 and the foam stabilizer 206 may be added to the storage vessel 200 in some implementations.

The magnesium oxide 204 and the foam stabilizer 206 are combined with the storable slurry in the storage vessel 200. The combining of the magnesium oxide 204 and the foam stabilizer 206 with the storable slurry may be a batch operation. In some implementations, the storage vessel 200 may have mechanical agitator (for example, propeller, blade turbine, or ribbon blender) to promote mixing. Alternatively, mixing can be advanced with a recirculation line, as discussed earlier. In implementations, the magnesium-oxychloride cement slurry 116 is pumped via the pump 208 into a casing 110 (FIG. 1) in the wellbore 102. The pump is operationally coupled to the vessel 200 to receive the magnesium-oxychloride cement slurry from the vessel 200 and pump the magnesium-oxychloride cement slurry into the wellbore 102.

The addition of the magnesium oxide 204 and the foam stabilizer 206 (in FIG. 2 and FIG. 3) to the mix vessel 202 (FIG. 2) or the storage vessel (FIG. 3) may be by separate conduits conveying the magnesium oxide 204 and the foam stabilizer 206, respectively. The sources of the magnesium oxide 204 and the foam stabilizer 206 may each be a vessel, such as a container. Control elements (for example, control valves or meters) may be disposed at the container or along the respective conduits to facilitate addition of the desired amount of magnesium oxide 204 and the foam stabilizer 206. In certain implementations, the motive force for addition of the magnesium oxide 204 and the foam stabilizer 206 may be by pressure differential. To provide for flow through the respective conduits, the pressure in the respective upstream container may be greater than the pressure at the vessel or conduit receiving the magnesium oxide 204 and the foam stabilizer 206.

Figure 4:
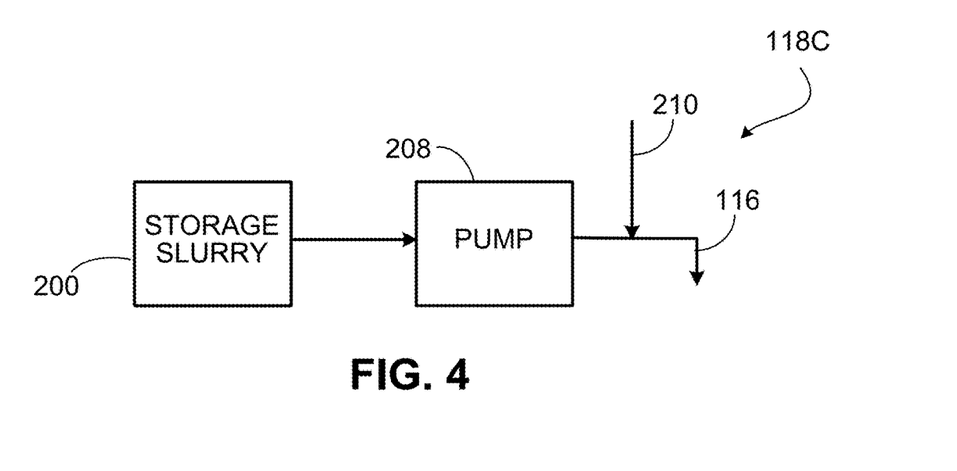

FIG. 4 is surface equipment 118C that is an embodiment of the surface equipment 118 at the well site 100 of FIG. 1. The surface equipment 118C provides the magnesium-oxychloride cement slurry 116 to the wellbore 102. The surface equipment 118C includes a storage vessel 200 to store the storable slurry. As discussed, the storable slurry may be a storable mixture of some components of a magnesium-oxychloride cement slurry 116. As also discussed, the storage vessel 200 may reside near or adjacent the wellbore 102 on the surface 104 (FIG. 1), a skid, or a vehicle. At the time for application of the cement slurry 116, the storable slurry in the storage vessel 200 is pumped by the pump 208 to the wellbore 102.

A mixture 210 of magnesium oxide and a foam surfactant is added to the conduit conveying the storable slurry to or from the pump 208. The magnesium oxide and the foam surfactant may added as separate individual streams to the conduit. In either case, the combination of the storable slurry with the magnesium oxide and the foam surfactant in the conduit gives the magnesium-oxychloride cement slurry 116 flowing through the conduit to the wellbore 102 and driven by the pump 208. This addition of the magnesium oxide and foam surfactant may be labeled as "on-the-fly" addition.

In implementations, the magnesium-oxychloride cement slurry 116 is pumped via the pump 208 into a casing 110 (FIG. 1) in the wellbore 102. The flow of the cement slurry 116 through the pump 208, conduits, casing 110, and annulus between the casing 110 and the formation surface 108 may promote mixing of components in the cement slurry 116.

In the illustrated embodiment, the pump 208 is coupled to the storage vessel 200 to receive the storage slurry via a suction conduit to the pump 208 and pump the storage slurry via a discharge conduit from the pump to the wellbore 102. While the mixture 210 of magnesium oxide and a foam surfactant is depicted in FIG. 4 as added to the discharge conduit of the pump 208, the mixture 210 may be instead added to the suction conduit upstream of the pump 208. Also, the magnesium oxide 204 and the foam surfactant 206 may added as separate individual streams (instead of as a mixture 210) to the discharge conduit or the suction conduit.

Embodiments include a system to apply a cement composition at a well site. The system includes a vessel at the well site to store a slurry having a pH less than 5 (or less than 4) for at least 24 hours at a temperature less than 140° F. The slurry includes at least water, magnesium chloride, a retarder, a viscosifier, and an azo compound. The well site includes a wellbore formed in a geological formation. The vessel is disposed adjacent the wellbore. For instance, the vessel may be within 50 meters of the wellbore. The system includes an addition conduit to add magnesium oxide to the slurry to give a magnesium-oxychloride cement slurry. The system includes a pump to provide motive force for conveying the magnesium-oxychloride cement slurry into the wellbore to fractures in the geological formation at a loss circulation zone along a range of depth of the wellbore. The pump may be a centrifugal pump. The addition conduit may add a mixture of the magnesium oxide and a foam stabilizer to the slurry to give the magnesium-oxychloride cement slurry. On the other hand, a second addition conduit may add the foam stabilizer to the slurry to give the magnesium-oxychloride cement slurry.

The addition conduit may be coupled to the vessel to add the magnesium oxide to the slurry in the vessel after storage of the slurry in the vessel for at least 24 hours to form the magnesium-oxychloride cement slurry in the vessel. In that implementation, the pump is coupled to the vessel to receive the magnesium-oxychloride cement slurry from the vessel and pump the magnesium-oxychloride cement slurry into the wellbore.

In some implementations, the pump is coupled to the vessel to receive the stored slurry from the vessel via a suction conduit coupled to the pump and discharge the stored slurry to the wellbore via a discharge conduit coupled to the pump. The addition conduit may be coupled to the suction conduit or the discharge conduit to add the magnesium oxide to the suction conduit or the discharge conduit to form the magnesium-oxychloride cement slurry.

The system may include a second vessel to receive the storable slurry from the vessel and where the addition conduit is coupled to the second vessel to add the magnesium oxide to the storable slurry in the second vessel to form the magnesium-oxychloride cement slurry in the second vessel. The pump may be coupled to the second vessel to receive the magnesium-oxychloride cement slurry from the second vessel and pump the magnesium-oxychloride cement slurry into the wellbore.

Example

The Example is given only as an example and not meant to limit the present techniques. A storable slurry was prepared with the following composition: water (60.4 grams [g]), $MgCl_2 \cdot 6H_2O$ (35.71 g), azodicarboxamide (1.71 g), SHMP (0.84 g), and xanthan (0.7 g). To prepare the storable slurry, the water (60.4 g) and SHMP (0.84 g) were added to a mixer having a propeller. The water and SHMP were mixed in the mixer for 2 minutes at 2000 revolutions per minute (rpm) of the propeller. The $MgCl_2$ (35.71 g) was then added to the mixer and the $MgCl_2$, water, and SHMP mixed for 5 minutes at 2000 rpm. The xanthan (0.7 g) was added to the mixer and the xanthan, $MgCl_2$, water, and SHMP mixed for 5 minutes at 2000 rpm. Lastly, the azodicarboxamide (1.71 g) was added to the mixer and the azodicarboxamide, xanthan, $MgCl_2$, water, and SHMP mixed for 2 minutes at 2000 rpm. The volume of the storable slurry so formed was approximately 100 cubic centimeters (cc). The pH of the storable slurry formed was approximately 3.5.

Figure 5:
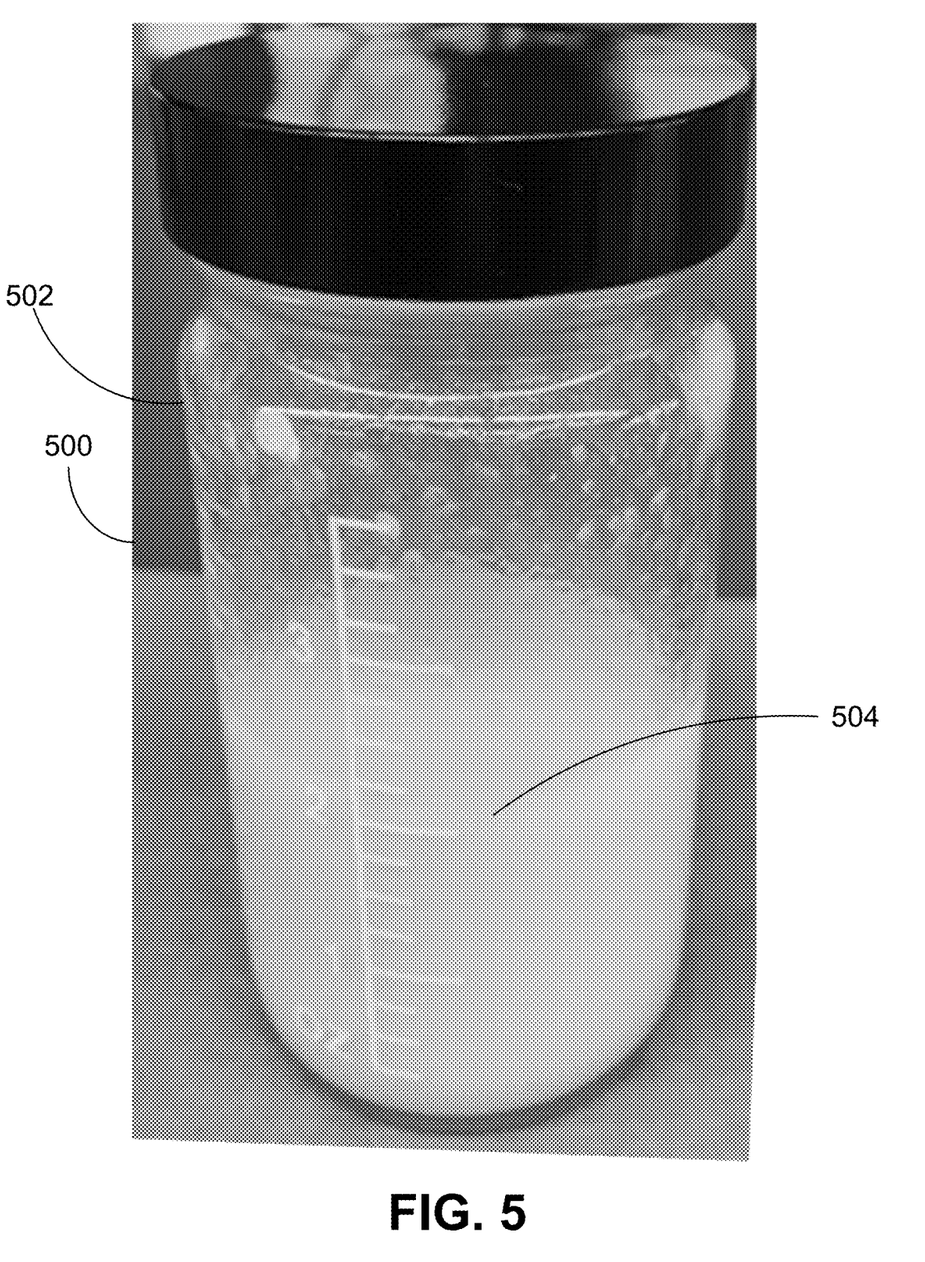
FIG. 5 is an image of a vial having the storable slurry formed in the Example.

FIG. 5 is an image 500 of a vial 502 having the storable slurry 504 formed in the Example. The color of the storable slurry 504 was a light orange. In practice, a storable slurry may be pre-mixed and stored at the well site at temperatures less than 140° F. Then, when is a LCM pill is desired, the remaining materials (MgO and foaming agent) can be added to the storable slurry at the well site and the mixture (cement slurry as LCM pill) pumped downhole.

In the Example, the storable slurry (15 cc) was mixed with MgO (6.4 g) and PETROSTEP™ SB (0.3 cc) to give a mixture (cement slurry) analogous to an implementation of a cement slurry (LCM pill) pumped downhole in a wellbore to cure loss circulation.

To perform expansion tests, two of these cement-slurry mixtures (identical) of MgO (6.4 g) and PETROSTEP™ SB (0.3 cc) mixed with the storable slurry (15 cc) were prepared in the Example. A test tube having the first mixture was placed in a water bath at 120° F. A test tube having the second mixture was placed in a water bath at 140° F. The mixture in the test tube in the water bath at 120° F. experienced a volume expansion of 206%. The mixture in the test tube in the water at 140° F. experienced a volume expansion of 266% filling the test tube and thus that expansion test was stopped. Table 1 gives the mixture volume in the respective test tubes as a function of time in the expansion tests.

TABLE 1

Mixture Volume as Function of Time

| 1st Test Tube - Water Bath (120° F.) | | 2nd Test Tube - Water Bath (140° F.) | |
| --- | --- | --- | --- |
| Time (minutes) | Mixture Volume (cc) | Time (minutes) | Mixture Volume (cc) |
| 0 | 15 | 0 | 15 |
| 40 | 20 | 20 | 21 |

TABLE 1-continued

Mixture Volume as Function of Time

| 1st Test Tube - Water Bath (120° F.) | | 2nd Test Tube - Water Bath (140° F.) | |
|---|---|---|---|
| Time (minutes) | Mixture Volume (cc) | Time (minutes) | Mixture Volume (cc) |
| 164 | 30 | 32 | 29 |
| 245 | 36 | 40 | 34 |
| 310 | 39 | 55 | 38 |
| 450 | 42 | 70 | 45 |
| 1200 | 46 | 85 | 55* |

*Test was stopped because test tube was completely full.

Figure 6:
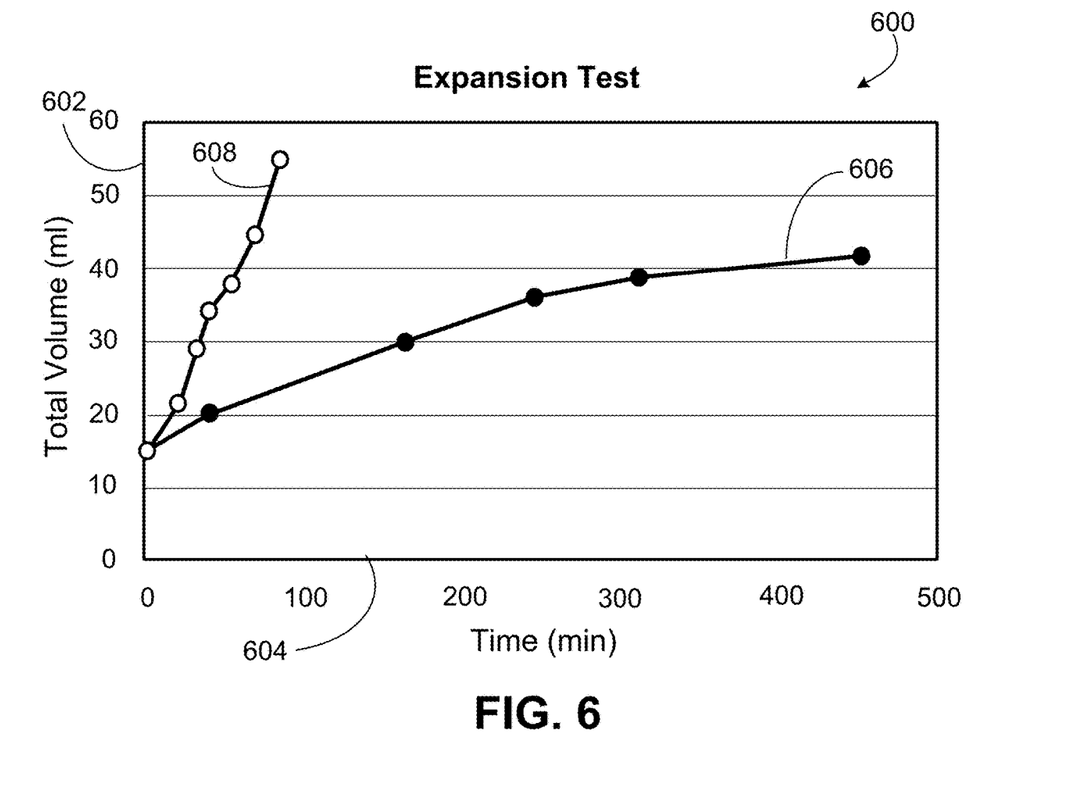
FIG. 6 is a plot of total volume over time for an expansion test.

FIG. 6 is a plot 600 of total volume 602 in milliliters (ml) over time 604 in minutes (min) for the two expansion tests. The two expansion tests are represented by curve 606 and curve 608, respectively. The curve 606 is the volume of the cement-slurry mixture over time in the first test tube in the water bath at 120° F. The curve 608 is the volume of the cement-slurry mixture over time in the second test tube in the water bath at 140° F.

Figure 7:
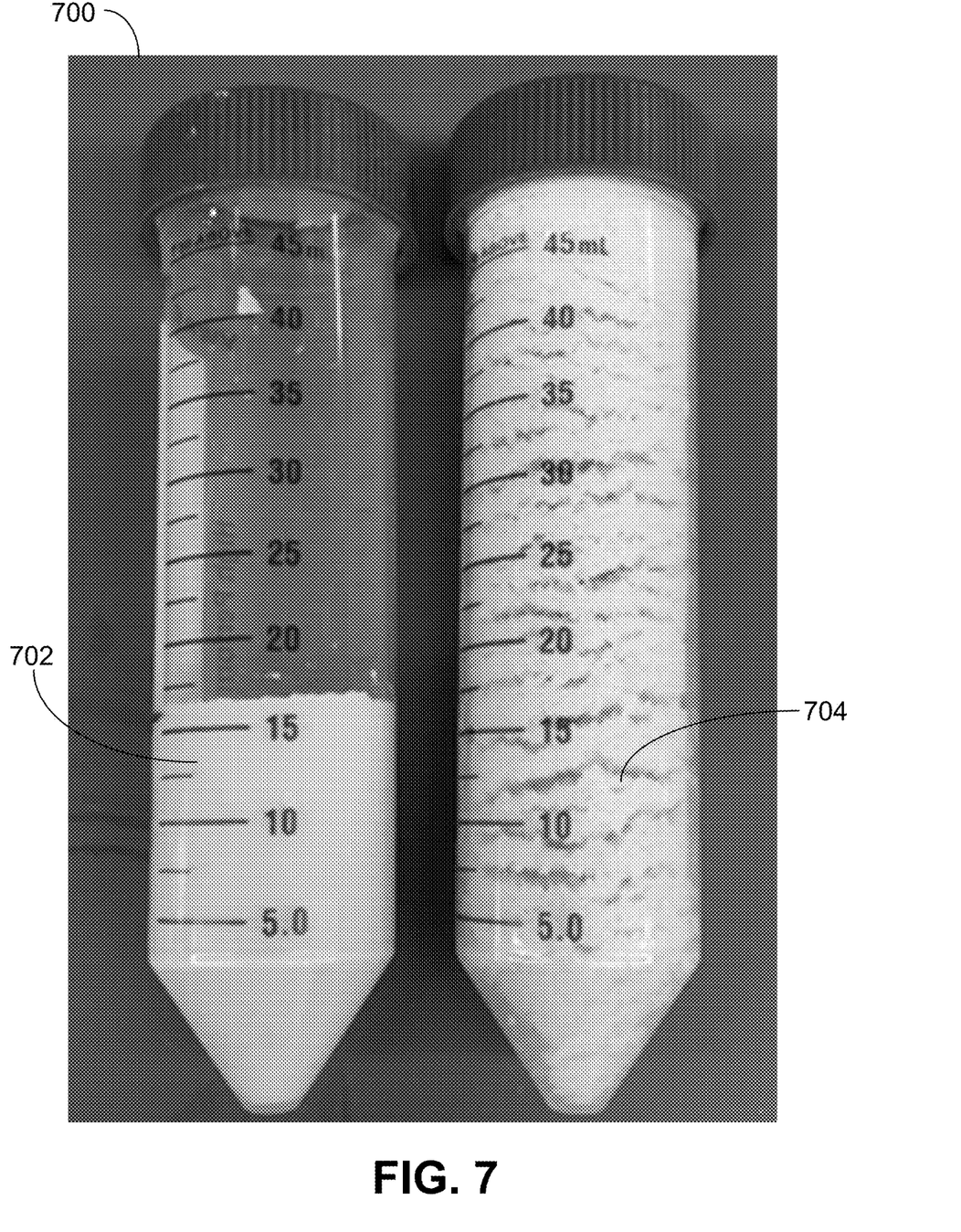
FIG. 7 is an image of a vial having a sample of the cement slurry in the Example prior to expansion and another vial having a sample of the expanded cement slurry after 16 hours in the water bath at 140° F.

FIG. 7 is an image 700 of a vial 702 having the cement slurry prior to expansion and another vial 704 having the expanded cement slurry after 16 hours in the water bath at 140° F. The numerical ruler (scale) for volume on the vials 702 and 704 is in milliliters. The vial 704 is the test tube from the expansion test temporarily removed from the 140° F. water bath at 16 hours.

As can be seen in Table 1 and FIG. 6, the rate of expansion of the cement slurry is temperature-dependent and increases with the increase in temperature. In practice, the percent (%) volume expansion of the cement slurry may be: (1) directly proportional to the amount of gas generating agent (azo compound) in the cement slurry; (2) directly proportional to the temperature, such as the downhole application temperature; and (3) inversely proportional to the pressure, such as the downhole application pressure.

Under downhole conditions in the wellbore and subterranean formation when the cement slurry deployed, implementations generate a hard-set foamed-Sorel (magnesium oxychloride) cement. In the preparing of the initial storable slurry including combining or mixing the water, the magnesium chloride, the retarder, the viscosifier, and the azo compound, the techniques may adjust amount or types of the components and also include additional components in the storable slurry. Setting conditions and delay for the cement can be adjusted by altering the type of MgO, specifying a different compound for the retarder, and adjusting the amount of retarder in the cement slurry. For instance, the amount of retarder in the storable slurry (and thus in the cement slurry) can be increased to promote more delay.

Also, the MgO can be specified to have an increasing amount of hard burnt type as compare to light burnt type or amorphous type to implement delay in the reaction forming the magnesium oxychloride cement. The MgO can be specified to have an increasing amount of light burnt type as compared to amorphous type to implement delay in the reaction forming the magnesium oxychloride cement. The preparing of the storable slurry may include adjusting a type of the MgO to adjust delay in reaction of subsequent formation of magnesium-oxychloride cement from the cement slurry. For example, the amount of MgO hard burnt may be increased relative to any MgO light burnt and any amorphous MgO to slow reactivity. The amount of MgO light burnt may be increased relative to any amorphous MgO to slow reactivity.

MgO may be produced by the calcination of magnesium carbonate or magnesium hydroxide. Calcining at different temperatures produces MgO of different reactivity: light burnt (a reactive form also known as caustic calcined magnesia); hard burnt (limited reactivity), or dead burnt (unreactive form used as a refractory). Amorphous MgO may be prepared by prolonged heating of the carbonate or hydroxide. Amorphous MgO is more reactive than light burnt and reacts at a lower temperature than the light burned.

The magnesium oxychloride cement may be soluble in acid, such as hydrochloric acid (for example, hydrogen chloride at 15 wt % in water). Acid solubility can be further enhanced by adding minerals or carbonate (for example, calcium carbonate) to the cement slurry composition. In one implementation, calcium carbonate ($CaCO_3$) powder having an average particle size less than 40 microns is added to the storable slurry to increase the acid solubility of the subsequently formed magnesium oxychloride cement. In certain embodiments, the amount of calcium carbonate powder added gives a weight ratio of at least 2 of the calcium carbonate power relative to the amount of MgO subsequently added. The weight ratio of the calcium carbonate powder to the MgO in the subsequently formed cement slurry may be at least 2.

The self-degradability of the magnesium oxychloride cement formed in the fractures may be increased by including a degradability additive in the storable slurry. The degradability additive may be, for example, polylactide or polylactic acid (PLA), polyglycolide or polyglycolic acid (PGA), or a blend of PLA and PGA. The PLA, PGA, or PLA/PGA blend may be in powder form as mixed into the storable slurry and produce organic acids in-situ at downhole temperatures to self-degrade the set magnesium-oxychloride cement. In certain implementations, the powder has an average particle size less than 40 microns. The amount of this powder (PLA, PGA, or PLA/PGA blend) added may give a weight ratio of the PLA, PGA, or PLA/PGA blend to MgO in the cement slurry of less than 0.5, less than 1.0, or less than 1.5.

Figure 8:
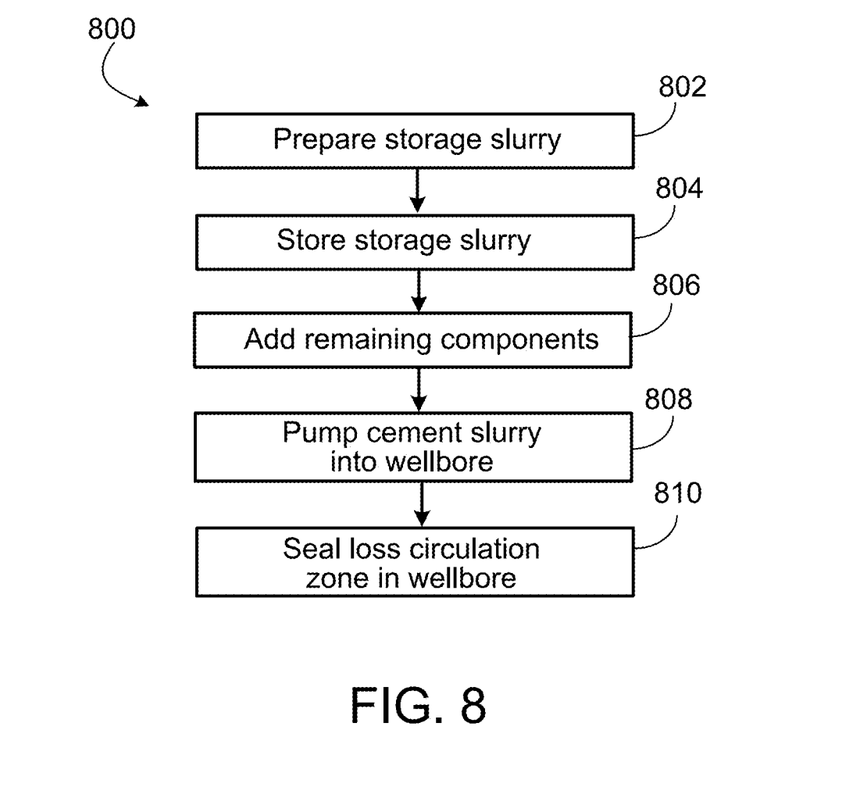
FIG. 8 is a block flow diagram of a method of applying a cement composition.

FIG. 8 is a method 800 of applying a cement composition. The application of the cement composition may involve a storable slurry utilized to form a cement slurry applied downhole in a wellbore in a geological formation. The cement slurry may be applied to cure a loss circulation zone along a range of depth of the wellbore.

At block 802, the method includes preparing the storable slurry. The storable slurry includes at least water, magnesium chloride ($MgCl_2$ or $MgCl_2$ hydrate), a retarder, a viscosifier (for example, HEC, CMHEC, or a polysaccharide), and an azo compound (for example, azodicarboxamide). In embodiments, the storable slurry has a pH less than 5 or less than 4. In certain implementations, the slurry includes at least 35 wt % water, at least 20 wt % magnesium chloride, and at least 0.2 wt % of the azo compound.

The preparation of the slurry may involve mixing the water, the magnesium chloride, the retarder, the viscosifier, and the azo compound. In one implementation, the preparation includes adjusting a type of the MgO included in the storable slurry to adjust delay in a subsequent reaction that forms magnesium-oxychloride cement from the magnesium-oxychloride cement slurry incorporating the storable slurry.

At block 804, the method includes storing the storable slurry, such as in a storage vessel. The method may include storing or holding the storable slurry (for example, in the vessel) for at least 24 hours at a temperature of the storable slurry less than 140° F. The storage vessel may be adjacent the wellbore (at a well site). For instance, the storage vessel may be disposed less than 50 meters from the wellbore.

In embodiments, the storable slurry has water in a range of 35 wt % to 80 wt %, magnesium chloride in a range of 20 wt % to 65 wt %, and the azo compound in a range of 0.2 wt % to 6 wt %. The storable slurry may have the retarder in a range of 0.1 wt % to 10 wt % and the viscosifier in a range of 0.1 wt % to 3 wt %.

At block 806, the method includes adding MgO and a foam stabilizer to the storable slurry to give the aforementioned magnesium-oxychloride cement slurry. The adding of the MgO and the foam stabilizer may involve adding the MgO and the foam stabilizer to the storable slurry in a vessel at the well site having the wellbore. The vessel may be, for example, the storage vessel or a mix vessel downstream of the storage vessel. The addition to the vessel may be a batch operation or batch mixing. In some implementations, the magnesium oxide and the foam stabilizer are not added to a vessel but instead added to a conduit conveying the storable slurry as the storable slurry is being pumped into the wellbore.

At block 808, the method includes pumping the magnesium-oxychloride cement slurry into the wellbore. The magnesium-oxychloride cement slurry may have at least 50 wt % (or at least 45 wt %) of the storable slurry.

In embodiments, the magnesium-oxychloride cement slurry includes the storable slurry in a range of 45 wt % to 80 wt %, magnesium oxide (MgO) in a range of 15 wt % to 50 wt %, and the foam stabilizer in a range of 0.3 wt % to 6 wt %. In certain embodiments, the magnesium-oxychloride cement slurry includes water in a range of 20 wt % to 55 wt %, $MgCl_2$ or $MgCl_2$ hydrate, or both, in a range of 10 wt % to 40 wt %, the azo compound in a range of 0.1 wt % to 4 wt %, the retarder in a range of 0.05 wt % to 6 wt %, and the viscosifier in a range of 0.05 wt % to 2 wt %.

The method may include generating nitrogen gas in the magnesium-oxychloride cement slurry via the azo compound to expand the magnesium-oxychloride cement slurry. The nitrogen gas may form as the magnesium-oxychloride cement slurry is being pumped into the wellbore and as the magnesium-oxychloride cement slurry is being applied downhole in the wellbore and the geological formation.

At block 810, the method includes sealing or curing (remedying) a loss circulation zone in the wellbore via application of the magnesium-oxychloride cement slurry. The sealing of the loss circulation zone may involve filling fractures of unknown dimensions in the geological formation with the magnesium-oxychloride cement slurry via the expansion of the magnesium-oxychloride cement slurry by the generated nitrogen gas. The sealing of the loss circulation zone may involve forming magnesium-oxychloride cement from the magnesium-oxychloride slurry in fractures in the geological formation at the loss circulation zone.

A number of implementations have been described. Nevertheless, it will be understood that various modifications may be made without departing from the spirit and scope of the disclosure.

What is claimed is:

1. A method of applying a cement composition, comprising:
    storing a slurry comprising a pH less than 5 for at least 24 hours comprising water, magnesium chloride, a retarder, a viscosifier, and an azo compound at a well site before application of the cement composition to a wellbore at the well site, thereby reducing time of preparing the cement composition contemporaneous with application of the cement composition to the wellbore;
    adding magnesium oxide and a foam stabilizer to the slurry to form a cement composition comprising a magnesium-oxychloride cement slurry contemporaneous with the application of the cement composition to the wellbore;
    pumping the magnesium-oxychloride cement slurry into the wellbore in a geological formation; and
    sealing a loss circulation zone in the wellbore with the magnesium-oxychloride cement slurry.

2. The method of claim 1, comprising specifying the storing of the slurry at the well site as an initial portion of the cement composition to be available on demand to reduce the time of preparing the cement composition contemporaneous with the application of the cement composition to the wellbore, wherein storing the slurry comprises storing the slurry as homogenous at a temperature less than 140° F. before the application of the cement composition to the wellbore, and wherein the slurry comprises a pH less than 4.

3. The method of claim 1, wherein storing the slurry is in response to specifying storing the slurry at the well site to be available on demand for at least three days for applying the cement composition to the wellbore to reduce the time of preparing the cement composition contemporaneous with the application of the cement composition to the wellbore, wherein storing the slurry comprises storing the slurry in a vessel adjacent the wellbore, and wherein the slurry comprises at least 35 weight percent (wt %) water, at least 20 wt % magnesium chloride, and at least 0.2 wt % of the azo compound.

4. The method of claim 1, comprising preparing the slurry comprising mixing the water, the magnesium chloride, the retarder, the viscosifier, and the azo compound, wherein preparing comprises adjusting a type of the magnesium chloride to adjust delay in a subsequent reaction that forms magnesium-oxychloride cement from the magnesium-oxychloride cement slurry, and wherein storing the slurry is in response to specifying storing the slurry at the well site to be available on demand to reduce the time of preparing the cement composition contemporaneous with the application of the cement composition to the wellbore.

5. The method of claim 1, wherein the reducing time comprises reducing amount of time of the application of the cement composition to the wellbore by storing the slurry at the well site in advance of the application of the cement composition to the wellbore, wherein adding the magnesium oxide and the foam stabilizer comprises adding, in a batch operation, the magnesium oxide and the foam stabilizer to the slurry in a vessel at the well site comprising the wellbore.

6. The method of claim 1, wherein storing the slurry comprises storing the slurry as homogenous and having a pH less than 4 in a vessel at the well site before the application of the cement composition to the wellbore, wherein adding the magnesium oxide and the foam stabilizer comprises adding the magnesium oxide and the foam stabilizer to the slurry in a conduit as the slurry is being pumped through the conduit into the wellbore at the time of application of the cement composition to the wellbore.

7. The method of claim 1, comprising specifying storing the slurry at the well site to be available on demand to reduce the time of preparing the cement composition contemporaneous with the application of the cement composition to the wellbore, wherein adding magnesium oxide and a foam stabilizer to the slurry is a batch operation, and wherein sealing the loss circulation zone comprises forming magnesium-oxychloride cement from the magnesium-oxychloride slurry in fractures in the geological formation at the loss circulation zone.

8. The method of claim 1, comprising:
specifying not incorporating the foam stabilizer in the slurry before the preparing of the cement composition contemporaneous with the application of the cement composition to the wellbore to avoid increasing pH of the slurry before the preparing of the cement composition contemporaneous with the application of the cement composition to the wellbore, wherein the foam stabilizer comprises a pH of at least 7, wherein the application of the cement composition to the wellbore comprises the pumping og the magnesium-oxychloride cement slurry into the wellbore, wherein storing the slurry comprises preparing and storing the slurry comprising a pH less than 4 before the pumping of the magnesium-oxychloride cement slurry into the wellbore; and
generating nitrogen gas in the magnesium-oxychloride cement slurry via the azo compound to expand the magnesium-oxychloride cement slurry, wherein sealing the loss circulation zone comprises filling fractures of unknown dimensions in the geological formation with the magnesium-oxychloride cement slurry via the expanding of the magnesium-oxychloride cement slurry.

9. A method of applying a cement composition, comprising:
storing a first slurry comprising a pH less than 5 for at least 24 hours at a well site having a wellbore before pumping a magnesium-oxychloride cement slurry into the wellbore, the first slurry comprising water, magnesium-chloride, a retarder, a viscosifier, and an azo compound;
adding magnesium oxide and a foam stabilizer to the first slurry to give a second slurry, wherein the second slurry forms the magnesium-oxychloride cement slurry; and
pumping the second slurry as the magnesium-oxychloride cement slurry into the wellbore in a subterranean formation to fill fractures in the subterranean formation with the second slurry to seal a loss circulation zone along the wellbore.

10. The method of claim 9, wherein the first slurry comprises the azo compound at less than 6 weight percent (wt %) of the first slurry.

11. The method of claim 9, wherein storing the first slurry comprises preparing wherein the first slurry comprises a pH less than 4, wherein adding the magnesium oxide and the foam stabilizer is a batch operation and comprises mixing the magnesium oxide and the foam stabilizer with the first slurry in a vessel adjacent the wellbore, wherein the foam stabilizer comprises a pH of at least 7, and wherein the method comprises specifying not adding the foam stabilizer to the first slurry as stored before contemporaneous with the pumping of the magnesium-oxychloride cement slurry to avoid increasing pH of the first slurry before contemporaneous with the pumping the magnesium=oxychloride cement slurry into the wellbore.

12. The method of claim 9, comprising specifying storing the first slurry at the well site to reduce an amount of time of applying the cement composition comprising magnesium-oxychloride cement to the wellbore, wherein adding the magnesium oxide and the foam stabilizer comprises adding the magnesium oxide and the foam stabilizer to the first slurry flowing through a conduit into the wellbore.

13. The method of claim 9, comprising preparing the first slurry as a portion of a loss circulation material (LCM) pill before pumping the second slurry as the LCM pill into the wellbore, wherein storing the first slurry comprises storing the first slurry as the initial portion at the well site before pumping the second slurry, wherein pumping the second slurry comprises pumping the second slurry with a centrifugal pump into a casing in the wellbore, wherein the second slurry exits the casing downhole in the wellbore and flows upward in an annulus between the casing and the subterranean formation to the loss circulation zone, and wherein the second slurry comprises at least 50 wt % of the first slurry.

14. The method of claim 9, wherein storing the first slurry comprises storing the first slurry as homogenous at the well site in advance of pumping the second slurry in response to specifying storing the first slurry to be available on demand, wherein the viscosifier comprises a hydroxyethyl cellulose (HEC), a carboxymethylhydroxyethyl cellulose (CMHEC), or a polysaccharide, or any combinations thereof, and wherein the foam stabilizer comprises a betaine or a hydroxysultaine, or a combination thereof.

15. The method of claim 9, wherein the first slurry is an initial portion of the cement composition and that is stored in response to specifying storing the initial portion to be available on demand for application of the cement composition to the wellbore to reduce time to apply the cement composition to the wellbore, and wherein the azo compound comprises azodicarboxamide.

16. The method of claim 9, comprising:
specifying storing the first slurry to reduce an amount of time of applying the cement composition comprising magnesium-oxychloride cement to the subterranean formation, wherein storing the first slurry reduces the amount of time of applying the cement composition to the subterranean formation; and
generating nitrogen gas in the second slurry via the azo compound to expand the second slurry in the fractures.

17. The method of claim 9, comprising preparing the first slurry at least 24 hours before adding the magnesium oxide and the foam stabilizer to the first slurry, wherein storing the first slurry gives the first slurry as available on demand at the well site, wherein the second slurry forms the magnesium-oxychloride cement slurry as the second slurry is pumped into the wellbore and as the second slurry fills the fractures.

18. The method of claim 9, comprising:
specifying storing the first slurry that is an initial portion of the cement composition to be available on demand for applying the cement composition to the wellbore to reduce time of applying the cement composition to the wellbore; and
forming magnesium-oxychloride cement in the fractures from the second slurry.

19. A method of applying a cement composition, comprising:
holding a storable slurry in a vessel at a pH less than 5 for at least 24 hours to be available on demand, thereby reducing an amount of time of applying the cement composition to a geological formation, the storable slurry comprising water, magnesium chloride, a retarder, a viscosifier, and an azo compound;
mixing magnesium oxide and a foam stabilizer with the storable slurry after holding the storable slurry at a pH less than 5 for at least 24 hours to give a cement slurry; and
pumping the cement slurry into a wellbore in the geological formation to fill fractures in the geological formation with the cement slurry to seal a loss circulation zone along the wellbore.

20. The method of claim 19, comprising sealing the loss circulation zone with the cement slurry comprising magnesium-oxychloride cement slurry forming magnesium-oxychloride cement in the fractures, wherein the vessel is within 50 meters of the wellbore.

21. The method of claim 20, comprising specifying holding the storable slurry in the vessel to be available on demand to reduce the amount of time of applying the cement composition comprising the magnesium-oxychloride cement to the geological formation, wherein the azo compound comprises azodicarboxamide, and wherein the foam stabilizer comprises a betaine or a hydroxysultaine, or a combination thereof.

22. The method of claim 19, wherein mixing the magnesium oxide and the foam stabilizer with the storable slurry is a batch operation, wherein the magnesium chloride comprises magnesium chloride ($MgCl_2$) or magnesium chloride hydrate ($MgCl_2$ hydrate), or both, and wherein the viscosifier comprises a hydroxyethyl cellulose (HEC), a carboxymethylhydroxyethyl cellulose (CMHEC), or a polysaccharide, or any combinations thereof.

23. The method of claim 19, wherein mixing the magnesium oxide and the foam stabilizer with the storable slurry comprises adding the magnesium oxide and the foam stabilizer to the storable slurry in a conduit as the storable slurry is being pumped through the conduit into the wellbore, wherein the storable slurry comprises water in a range of 35 weight percent (wt %) to 80 wt %, magnesium chloride in a range of 20 wt % to 65 wt %, and the azo compound in a range of 0.2 wt % to 6 wt %, and wherein the storable slurry comprises a pH less than 5.

24. The method of claim 19, wherein the storable slurry comprises the retarder in a range of 0.1 wt % to 10 wt % and the viscosifier in a range of 0.1 wt % to 3 wt %.

25. The method of claim 19, comprising preparing the storable slurry at least 24 hours before mixing the magnesium oxide and the foam stabilizer with the storable slurry, wherein the cement slurry comprises the storable slurry in a range of 45 wt % to 80 wt %, magnesium oxide (MgO) in a range of 15 wt % to 50 wt %, and the foam stabilizer in a range of 0.3 wt % to 6 wt %.

26. The method of claim 19, wherein the cement slurry comprises water in a range of 20 wt % to 55 wt %, $MgCl_2$ or $MgCl_2$ hydrate, or both, in a range of 10 wt % to 40 wt %, the azo compound in a range of 0.1 wt % to 4 wt %, the retarder in a range of 0.05 wt % to 6 wt %, and the viscosifier in a range of 0.05 wt % to 2 wt %.

27. A system to apply a cement composition at a well site, comprising:
a vessel at the well site to store a slurry comprising a pH less than 5 for at least 24 hours at a temperature less than 140° F. to make the slurry available on demand as an initial portion of the cement composition before the cement composition is applied downhole, the slurry comprising water, magnesium chloride, a retarder, a viscosifier, and an azo compound, wherein the well site comprises a wellbore formed in a geological formation, and wherein the vessel is disposed adjacent the wellbore;
an addition conduit to add magnesium oxide to the slurry to give a magnesium-oxychloride cement slurry; and
a pump to provide motive force for conveying the magnesium-oxychloride cement slurry into the wellbore to fractures in the geological formation at a loss circulation zone along a range of depth of the wellbore.

28. The system of claim 27, wherein the vessel is disposed within 50 meters of the wellbore, and wherein the pump comprises a centrifugal pump.

29. The system of claim 27, wherein the addition conduit adds a mixture of the magnesium oxide and a foam stabilizer to the slurry to give the magnesium-oxychloride cement slurry.

30. The system of claim 27, comprising a second addition conduit to add a foam stabilizer to the slurry to give the magnesium-oxychloride cement slurry.

31. The system of claim 27, wherein the system is configured to prepare the slurry in the vessel at least 24 hours before addition of the magnesium oxide to the slurry, wherein the addition conduit is coupled to the vessel to add the magnesium oxide to the slurry in the vessel in a batch operation after storage of the slurry in the vessel for at least 24 hours to form the magnesium-oxychloride cement slurry in the vessel, wherein the pump is coupled to the vessel to receive the magnesium-oxychloride cement slurry from the vessel and pump the magnesium-oxychloride cement slurry into the wellbore.

32. The system of claim 27, wherein the pump is coupled to the vessel to receive the slurry from the vessel via a suction conduit coupled to the pump and discharge the slurry to the wellbore via a discharge conduit coupled to the pump, and wherein the addition conduit is coupled to the suction conduit or the discharge conduit to add the magnesium oxide to the suction conduit or the discharge conduit.

33. The system of claim 27, comprising a second vessel to receive the storable slurry from the vessel, wherein the addition conduit is coupled to the second vessel as a batch system to add the magnesium oxide to the storable slurry in the second vessel in a batch operation to form the magnesium-oxychloride cement slurry in the second vessel, and wherein the pump is coupled to the second vessel to receive the magnesium-oxychloride cement slurry from the second vessel and pump the magnesium-oxychloride cement slurry into the wellbore.

34. The system of claim 33, wherein the system is configured to prepare the storable slurry in the vessel at least 24 hours before the second vessel receives the storable slurry from the vessel, wherein the second vessel comprises an agitator to mix the magnesium oxide with the storable slurry in the second vessel to form the magnesium-oxychloride cement slurry in the second vessel.

* * * * *

UNITED STATES PATENT AND TRADEMARK OFFICE
CERTIFICATE OF CORRECTION

PATENT NO. : 11,148,977 B2
APPLICATION NO. : 16/593667
DATED : October 19, 2021
INVENTOR(S) : Thaemlitz et al.

It is certified that error appears in the above-identified patent and that said Letters Patent is hereby corrected as shown below:

In the Claims

Column 15, Line 15, Claim 8, delete "og" and insert -- of --;

Column 15, Lines 34-35, Claim 9, delete "magnesium-chloride," and insert -- magnesium chloride, --;

Column 15, Line 59, Claim 11, delete "magnesium=oxychloride" and insert -- magnesium-oxychloride --.

Signed and Sealed this
Sixth Day of September, 2022

*Katherine Kelly Vidal*

Katherine Kelly Vidal
*Director of the United States Patent and Trademark Office*